Patented July 28, 1931

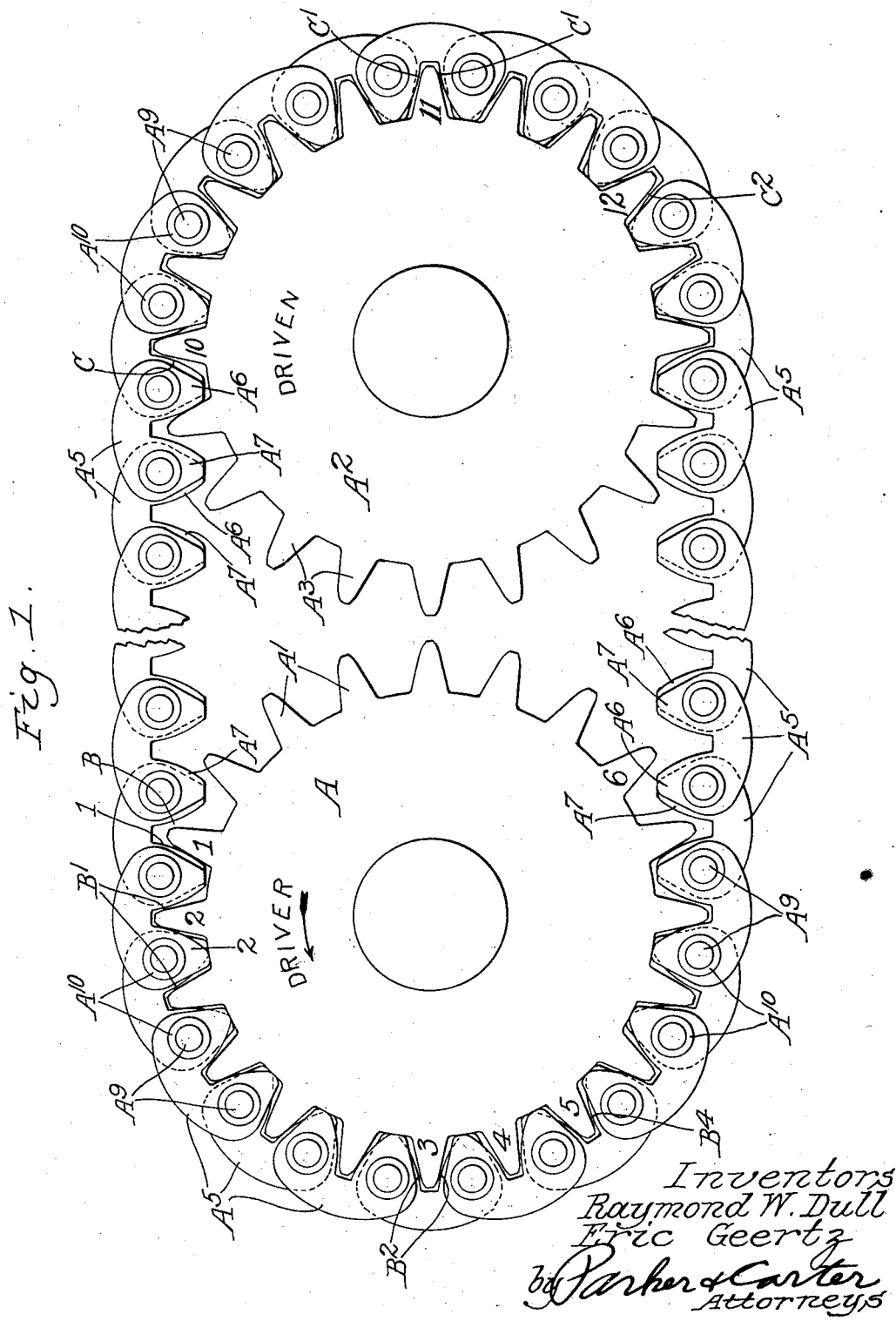

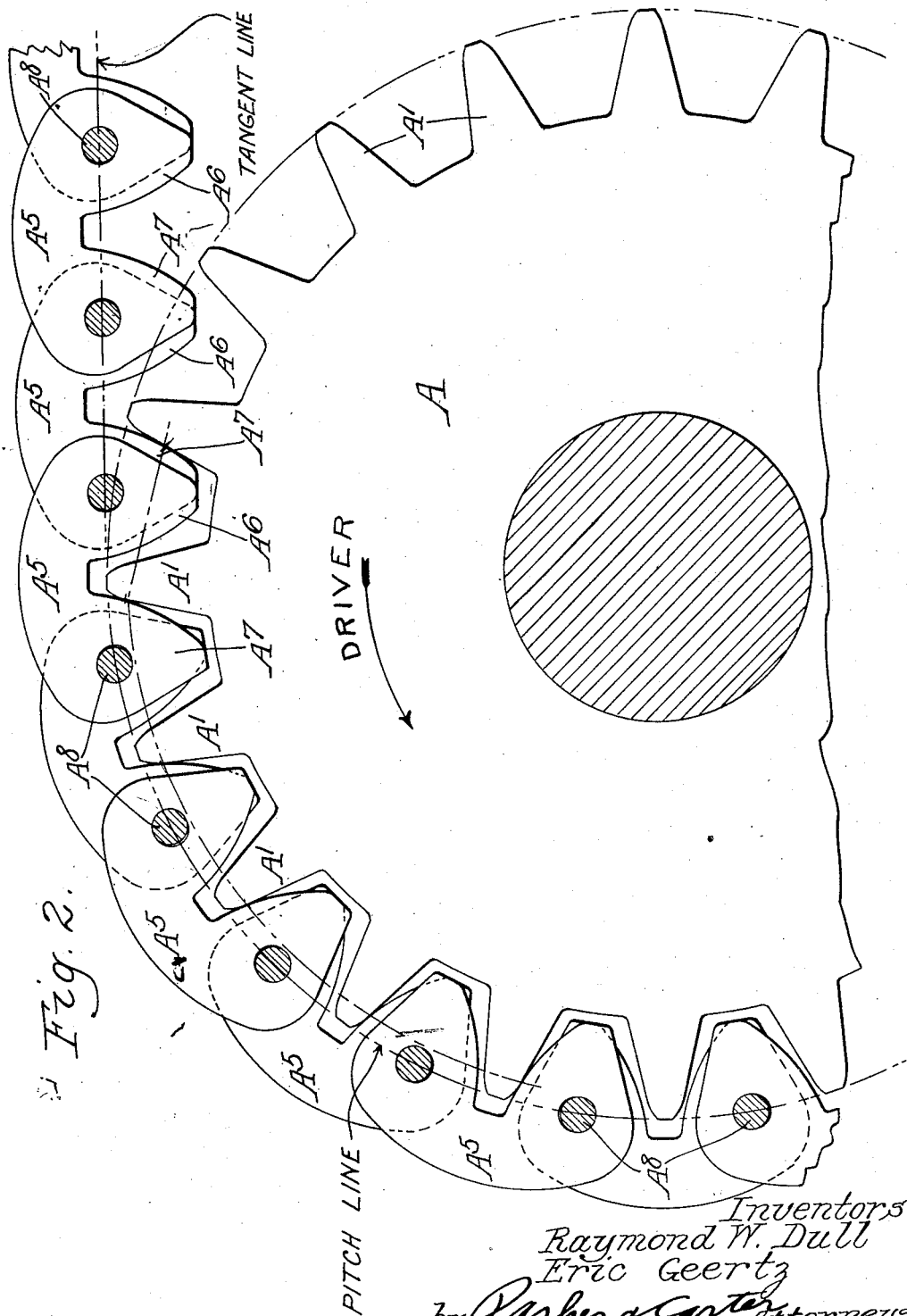

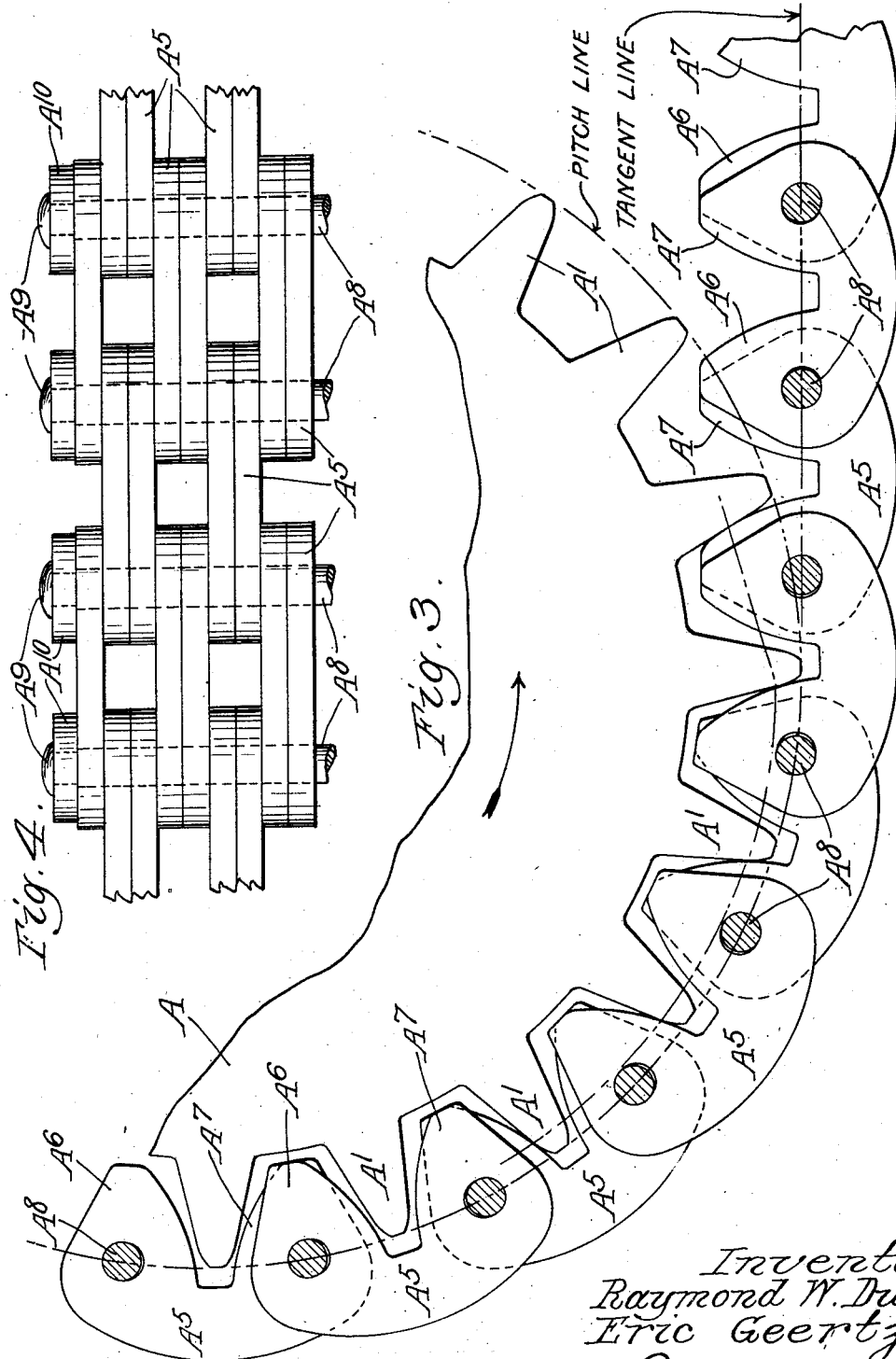

1,816,473

UNITED STATES PATENT OFFICE

RAYMOND W. DULL, OF CHICAGO, ILLINOIS, AND ERIC GEERTZ, OF INDIANAPOLIS, INDIANA, ASSIGNORS TO LINK-BELT COMPANY, OF CHICAGO, ILLINOIS, A CORPORATION OF ILLINOIS

SILENT CHAIN DRIVE

Application filed August 21, 1929. Serial No. 387,537.

Our invention relates to silent chain drives, primarily of the inside contact type, wherein each individual link making up the chain has two teeth which lie astride of the sprocket tooth with which the link has driving connection, the link being in contact with only one side or one working face of that tooth and the relation between the link and the sprocket tooth being such that under no combination of circumstances can the sprocket tooth ever wedge itself into the gap between the two link teeth. This is accomplished by providing, in co-operation with our inside drive chain, a so-called stub sprocket tooth, the length of the tooth being such that when the chain is pushed home so that it engages the root circle of the tooth there is still always clearance between the end of the tooth and the chain, and the relation between the thickness of the tooth and the distance between the chain teeth is such that only one chain tooth and one side of the sprocket tooth can be in contact at the same time.

Among the objects of our invention are: to provide a chain sprocket drive which will be inexpensive to manufacture, silent, and wherein a substantially constant speed relation between the chain and the sprocket will prevail. Another object of our invention is so to relate the chain faces of the sprocket teeth and chain teeth that the chain will enter and leave the sprocket substantially along a tangent to the pitch circle, thereby substantially avoiding longitudinal and transverse vibration of the chain. Another object is to provide a chain and chain sprocket so related that there never can be anything except single point contact between the sprocket tooth and any one of the chain links, so that the sprocket tooth may never be wedged into the pocket between the two adjacent teeth on a single chain link, thus preventing harshness and vibration which would result from such wedging if that were possible.

By working surfaces we mean those surfaces on the chain tooth and on the sprocket tooth which come together to establish a driving relation between chain and sprocket. By inside contact we mean a chain and sprocket relation wherein the working surfaces on the chain are not at the ends of the link but form the sides of the gap or pocket between the two teeth on the link, and wherein, therefore, the working surfaces on any chain link are located, not beyond the pivot points of the link, but between the link pivot points.

Our preferred form of link is, then, an inside contact link wherein the relation between the width of the gap between the two link working surfaces and the sprocket tooth with which they co-operate, and the length of the tooth above the root circle, is such that contact between the chain and sprocket can occur only between the non-working ends of the teeth and the root circle and between one side of the sprocket tooth and one, and only one, of the two teeth on each chain link.

Our invention is illustrated more or less diagrammatically in the accompanying drawings, wherein—

Figure 1 is a side elevation;

Figure 2 is a side elevation on an enlarged scale of the upper half of a sprocket chain with pintles in section;

Figure 3 is a similar view of the lower half of the sprocket;

Figure 4 is a plan view of a portion of the chain.

A is a driving gear or sprocket having teeth $A^1$. $A^2$ is the driven gear or sprocket having teeth $A^3$. Traveling about these two sprockets is a silent chain made up of a series of separate link members $A^5$, each having two chain teeth $A^6$ $A^7$ one at each end of the link. The interior opposed surfaces of these teeth are the working surfaces, the outer surfaces are cut away so that, no matter what the position of the chain, they lie inside the contour of the interior working surfaces, and the interior working surfaces only are able to engage the sprocket teeth. These chain links are assembled into a chain belt by means of pivot pins $A^8$ upset at $A^9$ against holding washers $A^{10}$. We have shown for purposes of illustration only these pins as being solid; they might be built up, they might be hollow, their particular shape and arrangement is of no consequence in so far as our present invention is concerned, it being merely necessary that they join the separate chain links together in interlocking overlapping relation so as to provide a continuous chain belt which travels about the sprockets with the chain teeth engaging the sprocket tooth. The teeth on a plurality of links are in line to form, in effect, a series of composite teeth which engage a series of sprocket teeth in driving relation.

The relation between the chain teeth $A^6$ $A^7$ and the sprocket tooth $A^1$ or $A^3$ which enters between them is such that there is never a simultaneous contact between the sprocket tooth and the two chain teeth between which it enters, but only contact between one side of the sprocket tooth and one of the interior working surfaces on the link, that is, there is never a simultaneous contact between a sprocket tooth and the working surfaces of two chain teeth on the same link. This is insured because, owing to the shortness of the stub tooth when the end point of either one or both of the chain teeth engages the cylindrical root circle adjoining the teeth on the sprocket, the chain link is held away far enough so that there must always be clearance between one side of the sprocket tooth and one of the teeth on any individual link when there is engagement between the other side of the same sprocket tooth and the other tooth on such first-mentioned link. Of course, the position may be such that there is clearance on both sides, but there never is simultaneous contact.

Referring now to Figure 1, the sprocket tooth which we have numbered 1 has just engaged the chain tooth 1 and there is a wide clearance B between the following tooth of that same link and the sprocket tooth. The sprocket tooth 2 has engaged the leading chain tooth 2 and there is a narrower clearance $B^1$ between the back of the sprocket tooth and the following tooth of the link. This narrower clearance $B^1$ persists as travel takes place around the sprocket with the sprocket tooth engaging the working surface on the back of the leading tooth of each chain link until some intermediate or transition point is reached as at 3, where there is a clearance $B^2$ between the sprocket tooth and both of the working faces on the chain teeth. This clearance is found also in connection with the next tooth 4. When tooth No. 5, however, is reached, the position of the clearance $B^4$ has moved and we now find that the sprocket tooth is in engagement with the working faces on the following chain tooth instead of the leading chain tooth, and this continues until the position 6 is reached, at which point the sprocket tooth is finally entirely out of contact with the chain and the chain is free to move away from the driving sprocket on its way to the driven sprocket, this side of the chain being the slack side as distinguished from the upper or incoming side, which is the tight side.

The same general situation prevails in connection with the driven sprocket. As the chain leaves the driven sprocket starting with the sprocket tooth 10, we find that the leading chain tooth is spaced from the sprocket 10 by a clearance C, the following chain tooth being in contact with the sprocket tooth, and this relation with the clearance between the leading side of the sprocket tooth and the working surfaces of the leading chain link prevails back as far as the transition point 11, where there is clearance $C^1$ on both sides of the sprocket tooth and no contact between it and either of the chain teeth. Beyond this point, for instance at 12, the relation is reversed and the contact is between the sprocket tooth and the leading chain tooth with clearance at $C^2$. This condition prevails throughout the remainder of the area of contact between the chain and sprocket.

It may even occur that there will be no such floating link, because it is possible that the transition will take place and be completed within a distance of less than one pitch. Also depending upon the pitch relation between the chain and the sprocket, the speed, the load, and the chain tension, the angular position of the transition point varies through a fairly wide range within the total angle of contact between sprocket and chain.

Referring now to Figures 2 and 3, there is illustrated on a larger scale the relation between the sprocket and the chain as the chain winds about the driver. It will be noted that in the initial position toward the right there is contact between the working face of the chain tooth toward its point and the forward working face of the sprocket tooth toward its base. As these two teeth roll and slide together as indicated diagrammatically in Figure 2, the line of contact moves outardly from the center of rotation of the sprocket until on the extreme left of Figure 2 the driving sprocket tooth toward its point engages the chain tooth toward its base. In Figure 3 the same thing is shown as applied to the leaving side of the driving sprocket. Here the slack chain as it leaves the sprocket is held back by the sprocket, and so there is a contact between the following side of the sprocket tooth and the following chain link tooth, as contrasted with the contact between the leading side of the sprocket tooth and the leading chain tooth in Figure 2. The same sliding and rolling action occurs so that the contact between the chain and sprocket teeth travels inwardly as the chain leaves the sprocket from the left hand position with contact between the top of the sprocket tooth and the base of the chain tooth to contact between the tip of the chain teeth and the base of the sprocket tooth, the displacement of this line of contact being along the dot and dash line as indicated.

The same relation prevails both with the driving and with the driven sprocket chain. If we regard the sprocket as being driven, then the chain of Figure 3, instead of being the slack side, will be the tight side and the chain of Figure 2, instead of being the tight side, will be the slack side of the chain, but the relation between the teeth on sprocket and chain would be the same in each case.

In Figures 2 and 3 is shown the position which may be assumed by the chain on the sprocket, for instance as the result of wear. The total length of the chain under these conditions will increase as shown. The result is that the links ride out along the sprocket tooth in the well known manner, but no matter how great this wear the relation remains the same, in so far as the fact is concerned that no individual chain link can ever touch both sides of the sprocket tooth with which it is related, because its inward movement tending to wedge it on that tooth is limited before such wedging action takes place, by engagement between the two ends of such link tooth and the root circle of the sprocket.

In Figure 1 the chain is shown as having root contact with the sprocket throughout the entire arc of contact with the sprocket. This is, of course, not the condition prevailing when the chain is running but may prevail while the chain is at rest. The drawing was made this way to point out and emphasize the fact that in our chain sprocket combination, even when the chain is forced as far in as it can go resulting in root contact, still there can never be simultaneous contact between a sprocket tooth and both of the teeth of the link straddling it. That is, our combination permits single interior contact but never under any circumstances double interior contact.

In actual running our chain may approach the position of root contact at the transition point where the tension on the chain parts is practically nil and everywhere else the chain distinctly tends to ride radially away from the position of root contact.

We claim:

1. In combination, a toothed sprocket and a chain comprising a plurality of inside contact toothed chain links, all of the links forming the chain being identical, and means for positively preventing engagement of any sprocket tooth with more than one of the teeth on each link at one time, said means comprising the face of the sprocket between adjacent sprocket teeth.

2. In combination with a toothed sprocket and chain comprising a plurality of inside contact toothed chain links, all of the links forming the chain being identical, there being a tapered pocket formed between two teeth on each link of such width that when the ends of the teeth rest on the sprocket on opposed sides of the tooth which penetrates the pocket, the tooth can engage one side of the pocket only at one time.

3. In combination with a toothed sprocket, a chain comprising a plurality of inside contact toothed chain links, all of the links forming the chain being identical, there being a tapered pocket formed between two teeth in each link of such width that when the ends of the teeth rest on the root surface of the sprocket on opposed sides of the tooth which penetrates the pocket, the tooth can engage one side of the pocket only at one time.

4. In combination with a toothed sprocket, a chain comprising a plurality of inside contact toothed chain links, all of the links forming the chain being identical, a pocket formed between two teeth in each link, the sprocket tooth being shorter than the link teeth with which it cooperates measured along radial lines about the center of the sprocket.

Signed at Chicago, county of Cook and State of Illinois, this 13th day of August, 1929.

RAYMOND W. DULL.

Signed at Indianapolis, in the county of Marion, and State of Indiana, this 16th day of August, 1929.

ERIC GEERTZ.